W. O. Hickok,
Making Wooden Screws.
№ 21,961. Patented Nov. 2, 1858.
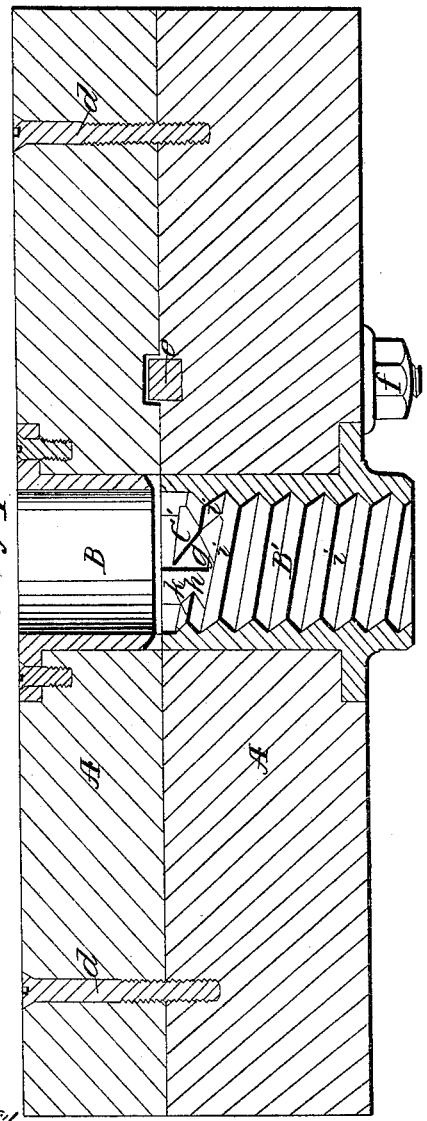
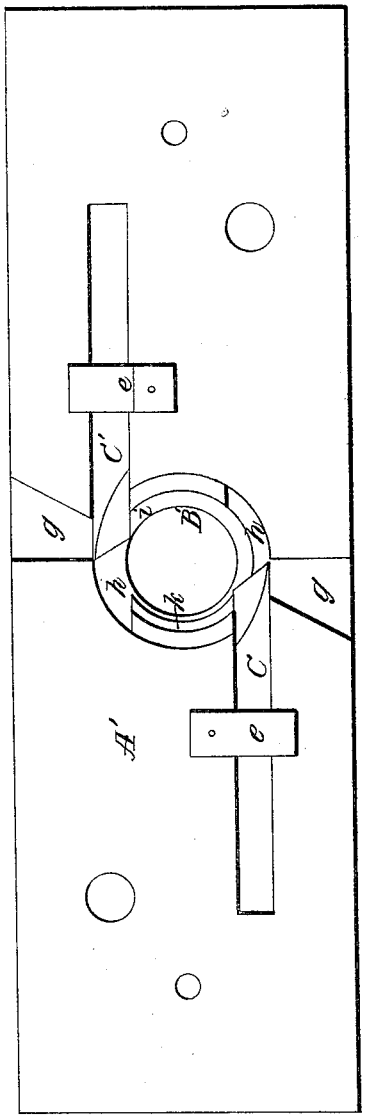
Witnesses:
Henry Beader
S. Schriver
Inventor:
W. O. Hickok

UNITED STATES PATENT OFFICE.

W. O. HICKOK, OF HARRISBURG, PENNSYLVANIA.

DIE FOR CUTTING WOODEN SCREWS.

Specification of Letters Patent No. 21,961, dated November 2, 1858.

*To all whom it may concern:*

Be it known that I, W. O. HICKOK, of Harrisburg, in the county of Dauphin and State of Pennsylvania, have invented a new and useful Improvement in Dies for Cutting Screws on Wood; and I do hereby declare that the following is a full, clear, and exact description of the construction and operation of the same, reference being had to the accompanying drawings, making a part of this specification, in which—

Figure 1 is a longitudinal section of the usual dies and stocks, with the said improvement applied thereto; and Fig. 2, a plan view of the lower half of the same, showing the relative arrangement of the invention and its cutter.

Like letters in the figures indicate the same parts.

In the stocks and dies heretofore constructed for cutting screws on wood, there is no provision made for compelling the cylindrical piece of wood upon which the screw is to be cut, to enter the cutting die at that regular speed during its rotation, which is required to make the first cutter produce a groove which shall perfectly harmonize in pitch with that of the succeeding threads of the said die; and consequently a rare degree of skill and manual dexterity is required in the operator, to enter the said cylinder of wood so as to cut the first round correctly; and, even in the hands of the most skilful workman, the threads produced will generally be imperfect and irregular, and often entirely useless until turned over in a lathe.

To remedy this deficiency in the instrument, is the object of my invention.

It consists in making a sectional follower-thread immediately in rear of the first cutter, which shall have the same pitch as the thread of the die, and fill the groove as it is made by the said first cutter, and so compel the cylinder of wood upon which a screw is to be cut, as it is being rotated, to advance to the second cutter within the die, at the regular speed required to produce a perfectly uniform screw thereon.

In the drawings A, and A', are the upper and lower parts of the stock respectively; B, and B', respectively, the upper and lower parts of the dies; and C, and C', the first and second cutters.

The two parts of the stock (A and A') are held accurately, and secured together firmly, by means of dowels, and the screws $d$, $d$, and their respective parts of the dies (B, and B',) secured firmly therein in the usual manner. The cutters (C and C'), are secured in slots made in the lower piece (A') of the stock, also in the usual manner, by means of the hooked bolts, $e—e$, and a nut and washer $f$, to each—lateral throats, $g$, $g$, being made in the stock so as to allow the chips to escape thereby freely; and the two opposite sides of the die (B') cut away at $h$, $h$, so as to admit of the proper adjustment of the cutters (C and C'). The second cutter (C') is adjusted in the usual manner so that the regular thread, $i$, of the die shall follow in and fill the groove which the said cutter makes, as the cylinder of wood upon which the screw is to be cut, is rotated against it. The first cutter (C) is adjusted so as to cut only a little more than half the required depth of the thread, and, heretofore, has not been provided with a follower-thread in its rear to compel a regular advance of the cylinder of wood into the die (B') as the groove it cuts is turned, during the rotation of the said cylinder, toward the second cutter—and hence the imperfect operation of the old instrument.

As before stated, my invention consists in making a sectional follower-thread in rear of the first cutter. This thread is shown in the figures at —$k$,—. It is made a part of the usual, regular thread ($i$), though separated therefrom by the side cuts ($h—h$) which are made in the die for the cutters, and also cut back or reduced in height so as to adapt it to follow in, and fill the half depth or partial cut which the first cutter (C) is adjusted to make in the cylinder of wood upon which the required screw is to be cut; and having the same pitch as the succeeding full threads ($i$), in its operation it necessarily compels the proper harmony between the advance and rotary motions of the said cylinder of wood in the die, and continually guides the groove in which it fits, into that precise juxtaposition with the second cutter (C') which is required—and so insures the production of the accuracy required in the pitch of the whole thread of the said screw; and also enables the most unskilful operator with it, to produce perfect results.

In the foregoing description the stock and dies are supposed to be held stationary, while the cylinder of wood upon which the screw is being cut, is rotated; but it is obvious that the same result will be produced upon the said cylinder, should it be fixed, and the stock and dies made to rotate upon it.

I do not claim the arrangement of two cutters in combination with the lower die, so as to cause the one to commence and the other to finish the groove which produces the thread upon the cylinder of wood operated upon—as this arrangement and combination is well known; but

What I claim as my invention and desire to secure by Letters Patent is—

The reduced sectional thread (k) in combination with the first cutter (C) when the same is made so as to operate in the manner and for the purpose set forth and described.

W. O. HICKOK.

Witnesses:
HENRY BEADEN,
S. SCHRIVER.